US010177478B2

(12) United States Patent
Watanabe et al.

(10) Patent No.: US 10,177,478 B2
(45) **Date of Patent: *Jan. 8, 2019**

(54) BOARD TERMINAL AND BOARD CONNECTOR

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Hajime Watanabe, Mie (JP); Yasushi Saitoh, Mie (JP); Yoshifumi Saka, Mie (JP)

(73) Assignees: AUTONETWORKS TECHNOLOGIES, LTD., Yokkaichi, Mie (JP); SUMITOMO WIRING SYSTEMS, LTD., Yokkaichi, Mie (JP); SUMITOMO ELECTRIC INDUSTRIES, LTD., Osaka-Shi, Osaka (JP)

( * ) Notice: Subject to any disclaimer, the term of this patent is extended or adjusted under 35 U.S.C. 154(b) by 152 days.

This patent is subject to a terminal disclaimer.

(21) Appl. No.: 15/030,072

(22) PCT Filed: Oct. 22, 2014

(86) PCT No.: PCT/JP2014/078045

§ 371 (c)(1),
(2) Date: Apr. 18, 2016

(87) PCT Pub. No.: WO2015/068572

PCT Pub. Date: May 14, 2015

(65) Prior Publication Data

US 2016/0240950 A1 Aug. 18, 2016

(30) Foreign Application Priority Data

Nov. 11, 2013 (JP) ................................ 2013-232916

(51) Int. Cl.
*B32B 15/01* (2006.01)
*H01R 13/03* (2006.01)
(Continued)

(52) U.S. Cl.
CPC ............... *H01R 13/03* (2013.01); *C25D 5/12* (2013.01); *C25D 5/505* (2013.01); *C25D 7/00* (2013.01);
(Continued)

(58) Field of Classification Search
None
See application file for complete search history.

(56) References Cited

U.S. PATENT DOCUMENTS 5,735,042 A * 4/1998 Takano .................. H01R 43/16 29/874
5,780,172 A * 7/1998 Fister ...................... B32B 15/01 428/647

(Continued)

FOREIGN PATENT DOCUMENTS

JP 2003-129278 5/2003
JP 2003-147579 5/2003

(Continued)

OTHER PUBLICATIONS

International Search Report, dated Jun. 12, 2015.

*Primary Examiner* — Seth Dumbris
(74) *Attorney, Agent, or Firm* — Gerald E. Hespos; Michael J. Porco; Matthew T. Hespos

(57) ABSTRACT

A board terminal 1 includes a base material 11 made of a metal material and a plating film 12 covering a surface of the base material 11. The plating film 12 includes an outermost layer 120 having a Sn mother phase 120*a* and Sn—Pd-based alloy phases 120*b* dispersed in the Sn mother phase 120*a*, the Sn mother phase 120*a* and the Sn—Pd-based alloy
(Continued)

phases 120*b* being present on an outer surface. A Pd content in the outermost layer 120 is not more than 7 atomic %. A board connector 2 includes the board terminal 1 and a housing 20 for holding the board terminal 1.

9 Claims, 3 Drawing Sheets

(51) Int. Cl.

| | |
|---|---|
| ***C25D 7/00*** | (2006.01) |
| ***C25D 5/12*** | (2006.01) |
| ***C25D 5/50*** | (2006.01) |
| ***H01R 12/71*** | (2011.01) |
| ***H01R 43/16*** | (2006.01) |
| *H01R 12/58* | (2011.01) |
| *H01R 12/72* | (2011.01) |
| *H01R 107/00* | (2006.01) |

(52) U.S. Cl.

CPC .......... *H01R 12/716* (2013.01); *H01R 43/16* (2013.01); *H01R 12/58* (2013.01); *H01R 12/724* (2013.01); *H01R 2107/00* (2013.01); *Y10T 428/12708* (2015.01); *Y10T 428/12715* (2015.01); *Y10T 428/12785* (2015.01); *Y10T 428/24917* (2015.01)

(56) References Cited

U.S. PATENT DOCUMENTS

| | | | | |
|---|---|---|---|---|
| 7,229,299 | B2 * | 6/2007 | Katayanagi .......... | H01R 12/714 439/95 |
| 2012/0107639 | A1 | 5/2012 | Takamizawa et al. | |
| 2015/0133005 | A1 | 5/2015 | Saka et al. | |
| 2017/0033486 | A1 * | 2/2017 | Saka ...................... | H01R 13/03 |
| 2017/0302016 | A1 * | 10/2017 | Watanabe .............. | H01R 13/03 |

FOREIGN PATENT DOCUMENTS

| | | |
|---|---|---|
| JP | 3926355 | 3/2007 |
| WO | 2011/001737 | 1/2011 |
| WO | 2013/168764 | 11/2013 |

* cited by examiner

BOARD TERMINAL AND BOARD CONNECTOR

BACKGROUND

1. Field of the Invention

The present invention relates to a board terminal and a board connector.

2. Description of the Related Art

Conventionally, a terminal including a base material made of Cu alloy and a Sn plating film covering a surface of the base material is known as a board terminal used for a printed circuit board. The board terminal of this type is generally held in a housing to constitute a board connector, and used by mounting the board connector on a printed circuit board or directly mounting the board terminal on the printed circuit board.

Japanese Unexamined Patent Publication No. 2003-147579 preceding the present application discloses a terminal including a plating film formed by successively laminating a Ni plating layer, a Cu plating layer and a Sn plating layer on a surface of a base material made of Cu alloy as a terminal used for various connectors. In this literature, it is described that an insertion force can be reduced at the time of connection to a mating terminal by adopting the above configuration.

Note that Publication of Japanese Patent No. 3926355 preceding the present application discloses an electrically conductive material for connection parts obtained by performing a reflow process after Cu plating and Sn plating are formed on an uneven Cu plate surface.

However, the prior art has a room for improvement in the following points. Specifically, the conventional terminal including the Sn plating film has a high friction coefficient of a Sn plating film surface due to the softness of Sn and has a problem that an insertion force increases at the time of connection to the mating terminal. Particularly, a board connector adopts a multi-pole structure using a plurality of board terminals in many cases and has a problem that an insertion force tends to increase as the number of terminals increases.

Further, the board terminal has one end connected to the printed circuit board by solder bonding in many cases. Thus, if the plating film has poor solder wettability, there is a problem that connection reliability is reduced.

The present invention was developed in view of the above background and attained with a view to providing a board terminal capable of realizing a low insertion force and having good solder wettability and a board connector using the same.

SUMMARY

One aspect of the present invention is directed to a board terminal with a base material made of a metal material, and a plating film covering a surface of the base material, wherein the plating film includes an outermost layer having a Sn mother phase and Sn—Pd-based alloy phases dispersed in the Sn mother phase, the Sn mother phase and the Sn—Pd-based alloy phases being present on an outer surface, and a Pd content in the outermost layer is not more than 7 atomic %.

Another aspect of the present invention is directed to a board connector with the above board terminal and a housing for holding the board terminal.

The above-described board terminal has the above configuration. Particularly, in the above board terminal, not only the relatively soft Sn mother phase, but also the Sn—Pd-based alloy phases having a relatively high hardness are present on the outer surface of the outermost layer of the plating film. Thus, a friction coefficient on the outer surface of the outermost layer is reduced in the board terminal and an insulation force at the time of connection to a mating terminal can be suppressed to be low.

Further, since the Pd content of the outermost layer is not more than 7 atomic % in the board terminal, good solder wettability can be ensured.

The board connector has the above configuration and, particularly, includes the board terminal. Thus, the board connector can be connected to a mating connector with a low insertion force. Further, in the board connector, the board terminal can be satisfactorily bonded when being mounted on a printed circuit board by solder bonding.

The above-described board terminal is used by having one end electrically connected to the printed circuit board and the other connected to the mating terminal. The board terminal may be connected to the printed circuit board in a state held in the housing or may be directly connected to the printed circuit board. In the former case, since plural board terminals normally are held in the housing, an increase of the insertion force associated with an increase in the number of the terminals easily can be suppressed at the time of connection to a mating connector and the above effect of reducing the insertion force can be exhibited sufficiently.

In the above-described board terminal, the base material forming a terminal shape is made of the metal material. For example, Cu or Cu alloy or Al or Al alloy or the like can be used as the metal constituting the base material. Cu or Cu alloy can be used favorably as the metal constituting the base material in terms of having a high conductivity, being rich in workability and having a suitable strength.

The base material can be formed of a wire material, a plate material or the like. Specifically, the base material can be formed by cutting the wire material or punching out the plate material. Note that plastic working can be applied such as by pressing before and/or after the wire material is cut. Further, plastic working can be applied to the punched-out plate material such as by pressing. If the base material is formed of the wire material, it is relatively difficult to provide the base material with surface unevenness as compared to the case where the base material is formed of the plate material. Thus, the insertion force has to be reduced by the plating film regardless of a surface configuration of the base material if the base material is formed of the wire material. Therefore, in this case, an effect of reducing the insertion force by adopting the plating film having the configuration of the present application can be sufficiently exhibited.

The plating film of the above-described board terminal may include the outermost layer. In the outermost layer, the Sn mother phase is a phase containing Sn as a main constituent element and can contain elements that may be contained in an inner layer to be described later such as Ni, Pd that is not taken into the Sn—Pd-based alloy phases, elements constituting the base material such as Cu, and the like beside Sn. Further, in the above-described outermost layer, the Sn—Pd-based alloy phases are phases mainly composed of alloy of Sn and Pd and can contain elements that may be contained in the inner layer to be described later such as Ni, elements constituting the base material such as Cu and the like beside Pd as an alloy constituent element.

Both the Sn mother phase and the Sn—Pd-based alloy phases of the above-described board terminal may be present on the outer surface of the outermost layer. Note that the Sn mother phase and the Sn—Pd-based alloy phases can also be present in the outermost layer. Further, a Sn oxide film may be present on the outer surface of the outermost layer within a range to realize a reduction of the insertion force without adversely affecting good solder wettability.

An area ratio of the Sn—Pd-based alloy phases occupying the outer surface of the outermost layer of the above-described board terminal can be specifically not less than 10% and preferably not less than 20%. Since the Sn—Pd-based alloy phases have a high effect of reducing a friction coefficient, it is possible to reduce the friction coefficient on the outer surface of the outermost layer in this case. Further, the area ratio of the Sn—Pd-based alloy phases occupying the outer surface of the outermost layer can be specifically not more than 80% and preferably not more than 50%. Since the Sn mother phase has a low contact resistance, a contact resistance of the terminal is reduced easily in this case. By setting the above-described area ratio to be not less than 10% and not more than 80%, a reduction of the friction coefficient and a reduction of the contact resistance are combined easily.

The Pd content in the outermost layer of the above-described board terminal can be not more than 7 atomic %. The Pd content means an atomic % of Pd to the sum of Sn and Pd contained in the outermost layer.

The Pd content in the outermost layer may be correlated with a zero cross time as an index of the solder weldability of the outermost layer. The zero cross time is specifically a time until a wetting stress value of a test piece including the above plating film and dipped in a solder bath becomes 0, the time being measured using a meniscograph method, and indicates a wetting speed of solder. Generally, the faster the wetting speed of solder, the shorter the zero cross time and the better the solder wettability. The zero cross time of the above-described board terminal is desirably not longer than 2.5 seconds and more preferably not longer than 2 seconds.

If the Pd content in the outermost layer exceeds 7 atomic %, the zero cross time exceeds 2.5 seconds and the solder wettability of the board terminal is deteriorated. The Pd content in the outermost layer can be preferably not more than 6.5 atomic %, more preferably 6 atomic %, further preferably not more than 5.5 atomic % and even more preferably not more than 5 atomic %. Note that the Pd content in the outermost layer can be not less than 1 atomic % in terms of ensuring the Sn—Pd-based alloy phases.

A thickness of the outermost layer of the above-described board terminal can be about 0.5 to 3 μm, preferably about 1 to 2 μm in terms of abrasion resistance, electrical conductivity and the like.

The plating film of the above-described board terminal may be composed of the outermost layer in contact with the base material or may include an inner layer interposed between the base material and the outermost layer. In the latter case, it is possible to improve the close contact of the plating film with the base material and suppress the dispersion of base material components into the outermost layer and the like by selecting the type of the inner layer.

The above-described inner layer can be composed of one layer or two or more layers. For example, Ni, Ni alloy and the like can be illustrated as materials of the above inner layer. In this case, more specifically, the above plating film can be composed of an inner layer having a double layer structure composed of a Ni layer in contact with the base material and a Ni—Sn alloy layer in contact with the Ni layer and the above-described outermost layer in contact with this inner layer.

The base material of the above-described board terminal may have a fracture surface formed during processing into a terminal shape, and the plating film may cover the surface of the base material including the fracture surface.

In this case, not only a principle surface of the base material, but also the fracture surface of the base material formed during processing into a terminal shape are covered by the plating film. Thus, in this case, solder wettability is easily ensured and connection reliability in solder-bonding the base material to a board is easily improved. Note that, specifically, a cut surface of a wire material that can constitute the base material, a punched-out surface of a plate material and the like can be illustrated as typical ones of the fracture surface. Further, the fracture surface of the base material may be entirely covered by the plating film or a part of the fracture surface not involved in connection to the printed circuit board may remain without being covered by the plating film.

The above-described board terminal can be, for example, formed such as by, after a Ni plating layer having a thickness of about 1 to 3 μm is formed on a base material surface made of Cu or Cu alloy according to need using an electroplating method, successively forming a Pd plating layer having a thickness of about 10 to 20 nm and a Sn plating layer having a thickness of about 1 to 2 μm and performing a reflow process at a heating temperature of 230 to 400° C.

The above-described board connector includes the above-described board terminal and a housing for holding the above board terminal. The board terminal can be held in the housing, for example, by being press-fitted through the rear wall of the housing. In this case, the board terminal specifically can adopt a configuration including a fitting connection portion to be fitted and connected to a mating terminal, a board connection portion to be connected to the board and a bent portion coupling between the fitting connection portion and the board connection portion and having an "L" shape or the like. Further, the board connector can be, for example, configured such that a plurality of board terminals are arranged in a housing arranged on a printed circuit board. In this case, since the insertion force of each board terminal is reduced, it is possible to effectively suppress an increase of the insertion force associated with an increase in the number of the terminals and connect the board connector to the mating connector with a low insertion force.

In the above-described board connector, the board terminal is preferably used by being mounted on a printed circuit board by solder bonding. Since the above board terminal includes the plating film having the above outermost layer, solder wettability is excellent and connection reliability can be improved.

Note that the respective configurations described above can be arbitrarily combined according to need such as to obtain the respective functions, effects and the like described above.

DETAILED DESCRIPTION

Hereinafter, board terminals and board connectors of embodiments are described using the drawings. Note that the same members are described using the same reference signs.

Figure 1:
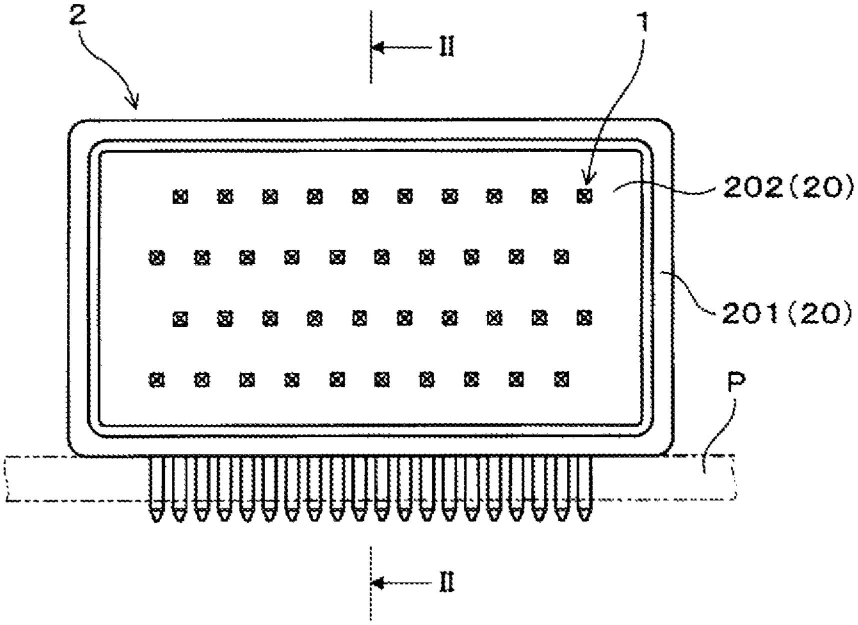
FIG. 1 is a diagram of board terminals and a board connector of a first embodiment.
Figure 2:
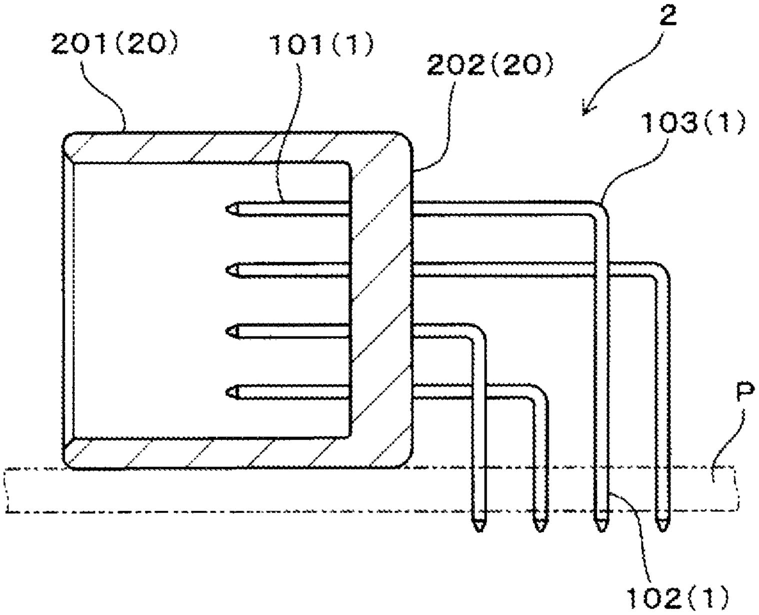
FIG. 2 is a section along II-II of FIG. 1.
Figure 3:
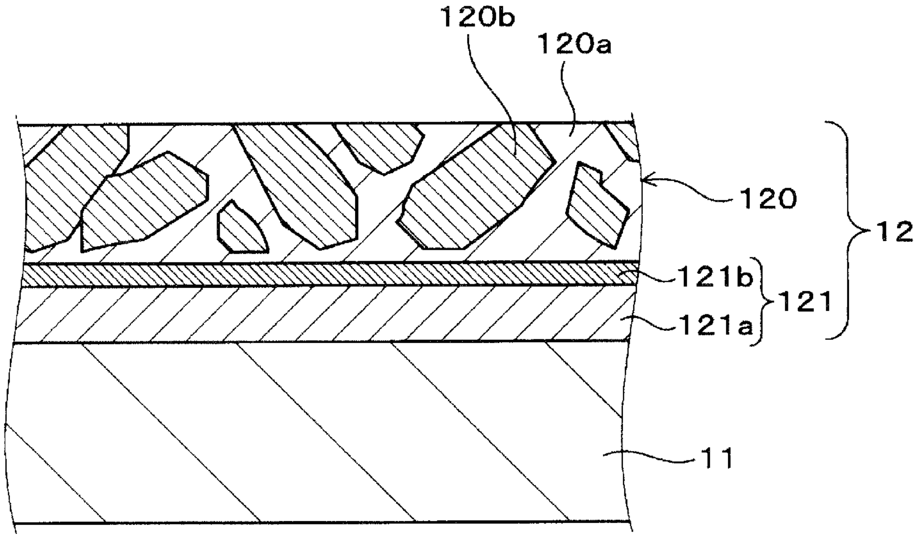
FIG. 3 is a diagram schematically showing a base material and a plating film in the board terminal and the board connector of the first embodiment.

Board terminals and a board connector of a first embodiment are described using FIGS. 1 to 3. As shown in FIGS. 1 to 3, a board terminal 1 of this embodiment includes a base material 11 made of a metal material and a plating film 12 covering a surface of the base material 11. The plating film 12 includes an outermost layer 120 having a Sn mother phase 120*a* and Sn—Pd-based alloy phases 120*b* dispersed in the Sn mother phase 120*a,* the Sn mother phase 120*a* and the Sn—Pd-based alloy phases 120*b* being present on an outer surface. A Pd content in the outermost layer 120 is not more than 7 atomic %. This is described in detail below.

In this embodiment, the board terminal 1 is applied to a board connector 2. The board terminal 1 specifically includes a fitting connection portion 101 to be fitted and connected to a mating terminal (not shown), a board connection portion 102 to be connected to a printed circuit board P and an L-shaped bent portion 103 coupling between the fitting connection portion 101 and the board connection portion 102. The board terminal 1 is formed by bending a Cu or Cu alloy wire material formed with the plating film 12 into an L shape. Note that the board terminal 1 may be formed by, after a Cu or Cu alloy plate material is punched out into a wire shape, forming the plating film 12 on the plate material and bending the plate material into an L shape.

In this embodiment, the plating film 12 specifically includes the outermost layer 120 and an inner layer 121 interposed between the base material 11 and the outermost layer 120. The inner layer 121 has a double layer structure composed of a Ni layer 121*a* in contact with the base material 11 and a Ni—Sn alloy layer 121*b* in contact with the Ni layer 121*a*. The outermost layer 120 is in contact with the Ni—Sn alloy layer 121*b* constituting this inner layer 121.

Note that the plating film 12 is formed by successively forming a Ni plating layer having a thickness of 1 to 3 μm, a Pd plating layer having a thickness of 10 to 20 nm and a Sn plating layer having a thickness of 1 to 2 μm on a surface of the base material 11 made of Cu or Cu alloy by an electroplating method and performing a reflow process at a heating temperature of 230 to 400° C.

Further, the board connector 2 of this embodiment includes the above board terminals 1 and a housing 20 for holding the board terminals 1.

In this embodiment, the board connector 2 specifically includes the housing 20 fixed to the printed circuit board P and a plurality of board terminals 1 mounted in the housing 20.

The housing 20 is made of synthetic resin, a receptacle 201 for accommodating a mating connector (not shown) at the time of connection is formed on a front side of the housing 20 and a back wall 202 is integrally formed on the back of the receptacle 201. The board terminals 1 are held by being press-fitted through the back wall 202 of the housing 20.

In the board connector 2, a part of the board terminal 1 projecting into the receptacle 201 is the fitting connection portion 101 to be fitted and connected to a female terminal provided in the mating connector, and an opposite end part serves as the board connection portion 102 to be connected to a land of the printed circuit board P by soldering.

Next, functions and effects of the board terminal and the board connector of this embodiment are described.

The board terminal 1 of this embodiment has the above configuration. Particularly, in the board terminal 1, not only the relatively soft Sn mother phase 120*a,* but also the Sn—Pd-based alloy phases 120*b* having a relatively high hardness are present on the outer surface of the outermost layer 120 of the plating film 12. Thus, a friction coefficient on the outer surface of the outermost layer 120 is reduced in the board terminal 1 and an insulation force at the time of connection to the mating terminal can be suppressed to be low.

Further, since the Pd content of the outermost layer 120 is not more than 7 atomic % in the board terminal 1, good solder wettability can be ensured.

Further, the plating film 12 of the board terminal 1 includes the inner layer 121. Thus, it is possible to improve the close contact of the plating film 12 with the base material 11 and suppress the dispersion of base material components into the outermost layer 120 and the like.

The board connector 2 of this embodiment has the above configuration and, particularly, includes the board terminals 1. Thus, the board connector 2 can be connected to the mating connector with a low insertion force. Particularly, since the board connector 2 includes the plurality of board terminals 1 in this embodiment, an increase of the insertion force due to an increase in the number of the terminals at the time of connector connection can be effectively suppressed by reducing the friction of the individual board terminals 1. Further, in the board connector 2, the board terminals 1 can be satisfactorily bonded when being mounted on the printed circuit board P by solder bonding.

Figure 4:
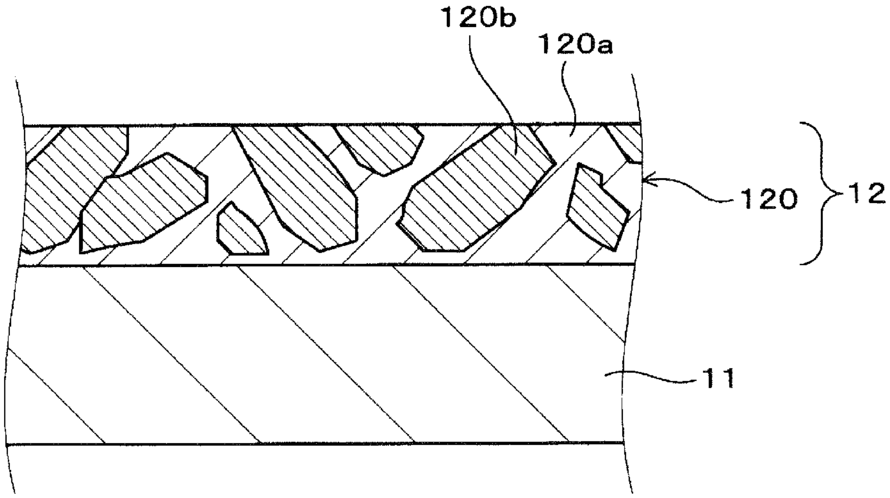
FIG. 4 is a diagram schematically showing a base material and a plating film in a board terminal and a board connector of a second embodiment.

A board terminal and a board connector of a second embodiment are described using FIG. 4. As shown in FIG. 4, a board terminal 1 of the second embodiment differs from the board terminal 1 of the first embodiment in that a plating film 12 does not include the inner layer 121 and is composed of an outermost layer 120. Further, a board connector 2 of the second embodiment differs from the board connector 2 of the third embodiment in that the board terminals 1 of the second embodiment are used. The other configuration is as in the first embodiment.

Even if the above configuration is adopted, it is possible to realize a low insertion force and obtain a board terminal with good solder wettability and a board connector using the board terminal.

EXPERIMENTAL EXAMPLES

The present invention is more specifically described using experimental examples below.

Example 1

A Ni plating layer having a thickness of 2.0 μm, a Pd plating layer having a thickness of 20 nm and a Sn plating layer having a thickness of 1.0 μm were successively formed on a surface of a clean copper board (size of 40 mm×100 mm, thickness of 300 μm). Thereafter, this is heated at 300° C. in the atmosphere to fabricate a plated member of sample 1.

A cross-section of the obtained plated member of sample 1 was observed by a scanning ion microscope (SIM). As a result, as shown in FIG. 3, a plating film was composed of an outermost layer and an inner layer having a double layer structure. The outermost layer specifically has a Sn mother phase and Sn—Pd-based alloy phases dispersed in the Sn mother phase and the Sn mother phase and the Sn—Pd-based alloy phases were present on the outer surface. Further, the inner layer was specifically composed of two layers, i.e. a Ni layer in contact with a base material and a Ni—Sn alloy layer in contact with the Ni layer. Further, in this experimental example, a Pd content in the outermost layer calculated using the thicknesses of the Sn plating layer and the Pd plating layer before the reflow process, densities and atomic weights of elements was 3.0 atomic %.

Note that, in the fabrication of the plated member of sample 1, only the Sn plating layer having a thickness of 1.0 μm was formed to obtain a plated member of comparative sample.

A dynamic friction coefficient was evaluated as an index of a terminal insertion force for the plated members of sample 1 and comparative sample. Specifically, a frictional force was measured using a load cell by holding the plated member in the form of a flat plate and an embossed plated member having a radius of 1 mm in contact in a vertical direction and pulling the embossed plated member in a horizontal direction at a speed of 10 mm/min while applying a load of 5 N in the vertical direction using a piezo actuator. At this time, a pulled distance was set as a friction distance. Then, a value obtained by dividing the above frictional force by the load was set as a friction coefficient.

Figure 5:
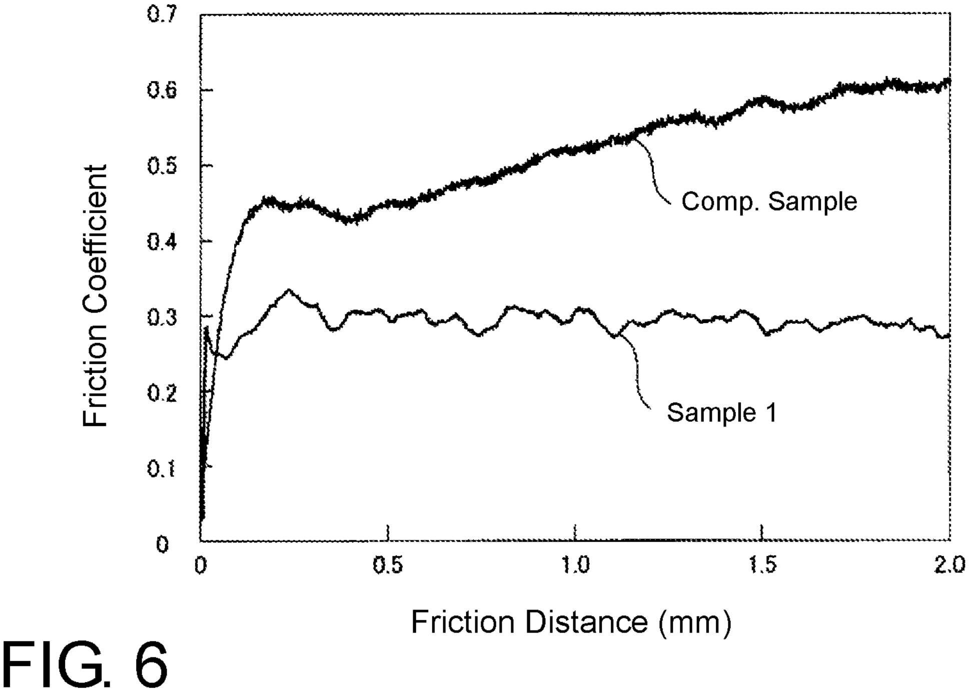
FIG. 5 is a graph showing a measurement result of a friction coefficient of a plated member fabricated in Example 1.

FIG. 5 shows a measurement result of the friction coefficients of the plated members of sample 1 and comparative sample. As shown in FIG. 5, the plated member of comparative sample is found to exhibit a high friction coefficient since the plating film is composed of the conventional Sn plating film. In contrast, since the plating film had the above configuration in the plated member of sample 1, it was confirmed that the friction coefficient was reduced as compared to the plated member of the comparative sample.

Example 2

Similarly to the fabrication of the plated member of sample 1, plated members of samples 2 to 4 having different Pd contents in the outermost layer were fabricated. At this time, the Pd content was adjusted by setting the thickness of the Sn plating layer at 1.0 μm and setting the thickness of the Pd plating layer at 10 nm (sample 2), at 20 nm (sample 3) and at 50 nm (sample 4). The Pd content of sample 2 was 1.6 atomic %, that of sample 3 is 3.0 atomic % and that of sample 4 is 6.4 atomic %.

The plated members of each sample and comparative sample were dipped in a solder bath and a zero cross time was measured using a meniscograph method in accordance with JIS Z 3198-4. The above measurement conditions were; used solder: Sn-3.0Ag-0.5Cu ("J3" produced by Ishikawa Metal Co., Ltd.), solder temperature: 250° C., dipping depth: 2 mm, dipping speed: 5 mm/sec and dipping time: 10 sec. The result is shown in FIG. 6.

Figure 6:
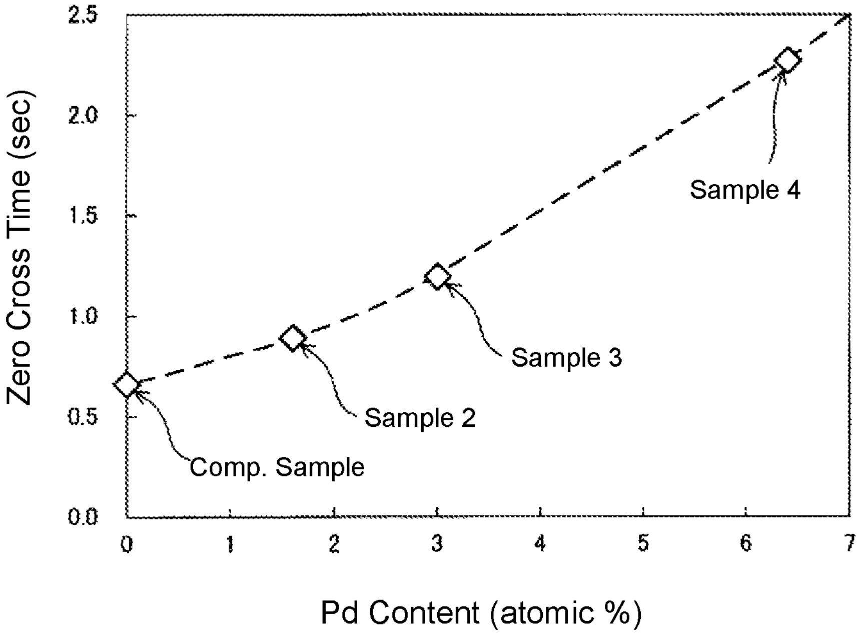
FIG. 6 is a graph showing a relationship between a Pd content in an outermost layer and a zero-cross time.

As shown in FIG. 6, it is found that the zero cross time can be not longer than 2.5 seconds if the Pd content of the outermost layer is not more than 7 atomic %. In other words, if the Pd content of the outermost layer exceeds 7 atomic %, the zero cross time exceeds 2.5 seconds, the solder wettability of the board terminal is deteriorated and connection reliability is reduced. Further, it is also found that the Pd content should be not more than 5.5% to set the zero cross time at 2 seconds or shorter in order to further improve the solder wettability of the board terminal.

Although the embodiments of the present invention have been described in detail above, the present invention is not limited to the above embodiments and various changes can be made within a range not impairing the gist of the present invention.

For example, an example of applying the above board terminal to the board connector was described in the above embodiments. Without limitation to this, the above board terminal can be formed into an optimal shape and can be used by being directly connected to the printed circuit board without being held in the housing.

The invention claimed is:

1. A board terminal, comprising:

a base material made of a metal material; and a plating film covering a surface of the base material; wherein:

the plating film includes an outermost layer having a Sn mother phase and Sn-Pd-based alloy phases dispersed in the Sn mother phase, the Sn mother phase and the Sn-Pd-based alloy phases being present on an outer surface;

the outermost layer has a Pd content of not more than 7 atomic %, and the outermost layer is in contact with an inner layer having a double layer structure composed of a Ni layer in contact with the base material and a Ni-Sn alloy layer in contact with the Ni layer or is in contact with the base material.

2. A board terminal according to claim 1, wherein:

the base material has a fracture surface formed during processing into a terminal shape; and the plating film covers the surface of the base material including the fracture surface.

3. A board terminal according to claim 1, wherein the base material is Cu or Cu alloy.

4. A board terminal according to claim 1, wherein an area ratio of the Sn-Pd alloy phases occupying the outer surface of the outermost layer is not less than 10% and not more than 80%.

5. A board connector, comprising:

a board terminal according to claim 1; and a housing for holding the board terminal.

6. A board connector according to claim 5, wherein the board terminal is used by being mounted on a printed circuit board by solder bonding.

7. A board terminal, comprising:

a base material made of a metal material; and a plating film covering a surface of the base material, the plating film including an inner layer having a double layer structure composed of a Ni layer in contact with the base material and a Ni-Sn alloy layer in contact with the Ni layer or is in contact with the base material and an outermost layer in contact with the inner layer and having a Sn mother phase and Sn-Pd-based alloy phases dispersed in the Sn mother phase, the Sn mother phase and the Sn-Pd-based alloy phases being present on an outer surface of the outermost layer so that an area ratio of Sn-Pd alloy phases occupying the outer surface is not less than 10% and not more than 80%;

wherein:

the outermost layer is formed by performing a reflow process after a Pd plating layer having a thickness of not smaller than 10 nm and smaller than 20 nm and a Sn plating layer having a thickness of not smaller than 1 μm and not larger than 2μm are successively formed, the outermost layer has a Pd content of not more than 7 atomic %.

8. A board terminal according to claim 7, wherein:

the base material has a fracture surface formed during processing into a terminal shape; and the plating film covers the surface of the base material including the fracture surface.

9. A board terminal according to claim 7, wherein the base material is Cu or Cu alloy.

* * * * *